June 19, 1923.

A. J. DUBEE

BRUSH AND MOP HOLDER

Filed June 4, 1921

1,459,582

Adelarde J. Dubee, INVENTOR

BY Victor J. Evans, ATTORNEY

WITNESS: J. W. Ely.

Patented June 19, 1923.

1,459,582

UNITED STATES PATENT OFFICE.

ADELARD JOSEPH DUBEE, OF GLENS FALLS, NEW YORK.

BRUSH AND MOP HOLDER.

Application filed June 4, 1921. Serial No. 474,876.

*To all whom it may concern:*

Be it known that I, ADELARD JOSEPH DUBEE, a citizen of the United States, residing at Glens Falls, in the county of Warren and State of New York, have invented new and useful Improvements in Brush and Mop Holders, of which the following is a specification.

This invention relates to brush and broom holders, and the principal object is to produce a device of this kind in which the metal sheath shall be provided with a rubber or other resilient lining for gripping and securing the handle of a brush, broom, mop or other device in place.

Another object is to produce a device of this nature in which the resilient lining is detachably secured to the sheath so that said lining may be readily removed when worn or injured and may be replaced by a new lining without the necessity of supplying also a new sheath.

Another object is to produce a base or holder to which the sheath may be secured, said holder being provided with means for securing it to a wall or other suitable support.

Another object is to produce a device of this nature which shall be simple of construction, cheap to manufacture, and highly efficient for the purpose for which it is designed.

With these and other objects in view which will be more apparent as the specification proceeds, the invention resides in certain novel construction and combination and arrangement of parts the essential features of which are hereinafter fully described, are particularly pointed out in the appended claims, and are illustrated in the accompanying drawing, in which:—

Like characters of reference refer to like parts in all views.

Figure 1:
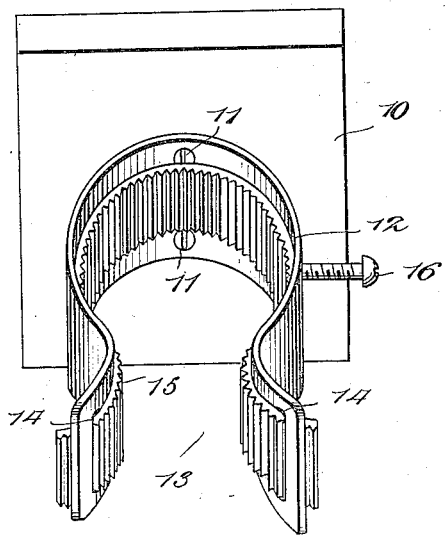
Figure 1 is a perspective view of one form of embodiment of my invention.

Referring to the drawings in detail and in particular to Figure 1, 10 represents a support which may be either a wall, wainscot or a separate block, to which are secured by screws 11, a sheath member 12 preferably constructed from sheet steel or other spring metal and formed with a constricted neck 13. Near the ends of member 12 are cut or punched elongated apertures or slots 14 through which pass the ends of a lining strip 15 preferably formed of rubber or rubber coated fabric having corrugations or ribs which may run either crosswise or lengthwise of the strip 15 and the purpose of which is to form a gripping surface for contacting with the handle of a broom, mop or other similar implements. A screw 16 passes through an aperture in the side of the sheath 12 and into contact with the surface of the lining strip 15, and upon adjustment of this screw the lining strip may be forced into the sheath so as to accommodate the device to various sizes of handles.

Figures 2, 3:
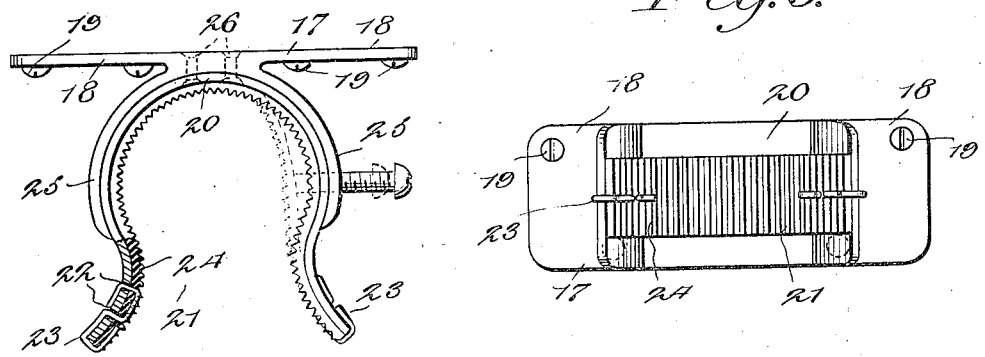
Figure 2 is a top plan view of a second form of my invention.
Figure 3 is a front view of the form shown in Figure 2.

In the form shown in Figures 2 and 3, a base member 17 is provided, having ears 18 through which screws 19 may be passed to secure the base to the wall or woodwork of a room. A metal sheath 20 similar to the one described in the form preceding has a constricted neck 21 but instead of being provided with slots, is formed with two small holes 22 near each end through which wires 23 are threaded so as to secure the lining strip 24 in position as shown in the drawing. The member 20 is held between a pair of curved ears 25 of member 17 and is secured to the base 17 by means of screws 26 or any other suitable means.

While I have described two means of securing the lining strip to the sheath member, it is obvious that many other means might be resorted to, and I do not limit myself to the exact details of the construction herein set forth but may resort to any mechanical expedient lying within the spirit of my invention as above set forth.

What is claimed is:—

1. As an article of manufacture, a brush and broom holder comprising a metal sheath having a curved broom-handle-receiving portion and a constricted neck portion, a flexible lining strip lying interiorly of said sheath member and secured thereto near the constricted portion of said sheath member, and means for co-operation with said sheath member for adjusting said lining strip to accommodate various sizes of handles.

2. As an article of manufacture, a brush and broom holder comprising a metal sheath having a curved broom handle receiving portion and a constricted neck portion, a corrugated flexible binding strip lined interiorly of said sheath member and secured thereto near the constricted portion of said sheath member, a screw carried by said sheath member for adjusting said lining strip to accommodate various sized handles.

In testimony whereof I have affixed my signature.

ADELARD JOSEPH DUBEE.